(12) United States Patent
Hirooka

(10) Patent No.: US 6,369,916 B1
(45) Date of Patent: Apr. 9, 2002

(54) DOT AREA JUDGING APPARATUS

(75) Inventor: Yoshiaki Hirooka, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 0 days.

(21) Appl. No.: 09/179,865

(22) Filed: Oct. 28, 1998

(30) Foreign Application Priority Data

Nov. 12, 1997 (JP) .............................................. 9-310846

(51) Int. Cl.$^7$ ................................................. H04N 1/40
(52) U.S. Cl. ...................................... 358/462; 382/162
(58) Field of Search ................................ 358/462, 474, 358/496, 298, 500, 505; 382/162, 132

(56) References Cited

U.S. PATENT DOCUMENTS

| | | | |
|---|---|---|---|
| 5,729,627 A | 3/1998 | Mizuno | 382/173 |
| 5,754,312 A | 5/1998 | Fujimoto | 358/462 |

FOREIGN PATENT DOCUMENTS

| | | | |
|---|---|---|---|
| JP | 3-276966 | | 12/1991 |
| JP | 08163354 | * | 6/1996 |
| JP | 08-163355 | | 6/1996 |

* cited by examiner

*Primary Examiner*—Jerome Grant, II
*Assistant Examiner*—Negussie Worku
(74) *Attorney, Agent, or Firm*—Smith, Gambrell & Russell, LLP

(57) ABSTRACT

An apparatus to judge, on the basis of image data indicative of the densities of individual pixels in a document original image, whether or not a judgment area in the document original image is a dot area. The apparatus includes: a dot candidate pixel detecting section for detecting a dot candidate pixel on the basis of image data for a plurality of lines; an extension processing section for extensively applying a dot candidate pixel detection result for an object line to lines adjacent to the object line; and a dot area judging section for judging, on the basis of the distribution of dot candidate pixels within a judgment base area, that a judgment area having a predetermined positional relationship with the judgment base area is a dot area.

7 Claims, 10 Drawing Sheets

F I G. 7
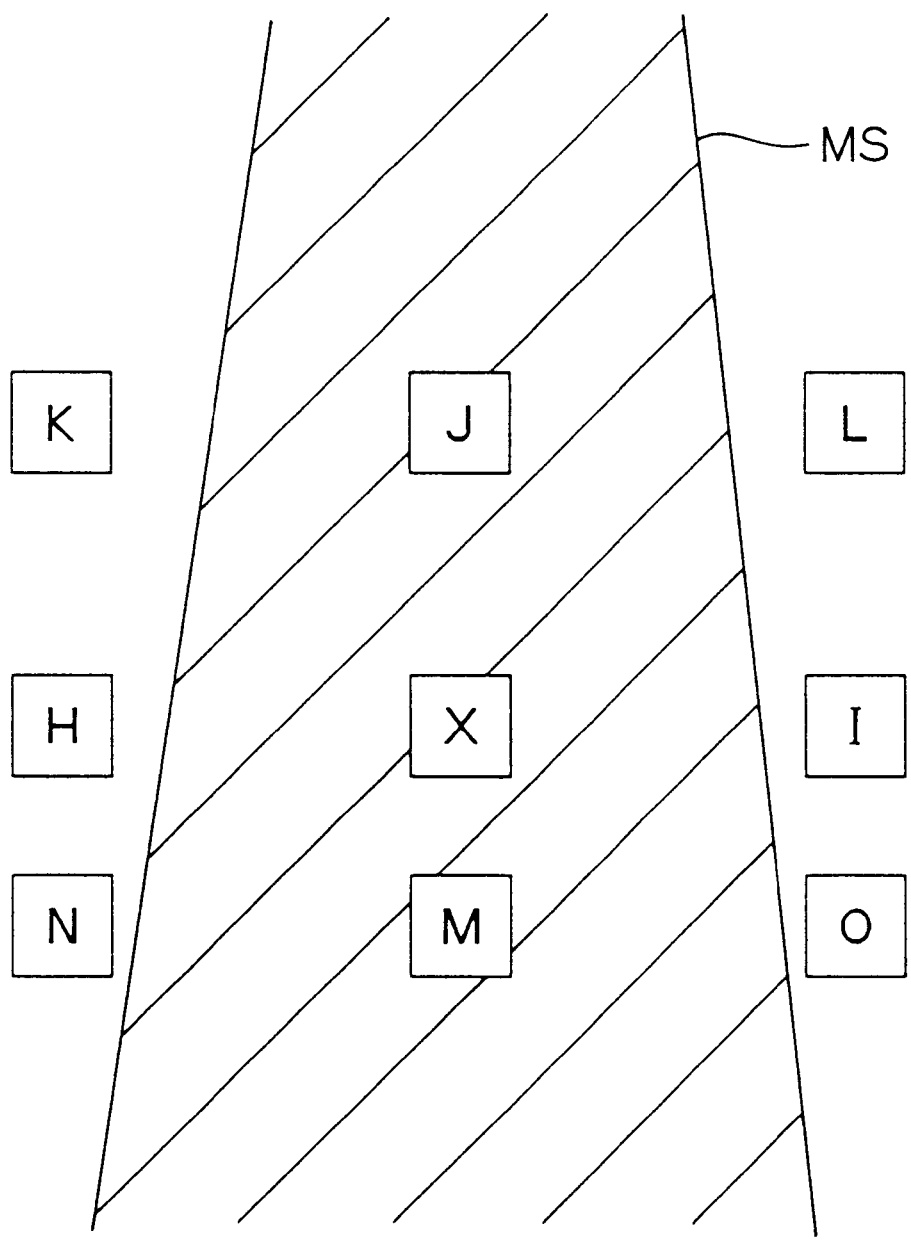

DOT AREA JUDGING APPARATUS

BACKGROUND OF THE INVENTION

1. Field of the Invention

The present invention relates to a dot area judging apparatus which is applied to an image forming apparatus such as a copying machine and adapted to determine whether or not any dot area is contained in a document original image read by a scanner or the like.

2. Description of Related Art

Digital copying machines are available which are adapted to optically read a document original image by a scanner such as comprised of a CCD (charge coupled device), convert the image into image data indicative of individual pixel densities, and reproduce the document original image on the basis of the image data.

Such a digital copying machine is designed to make a high quality copy of a document original even if a character image, a photographic image and a dotted image are contained together in the document original, the dotted image having shades represented by equidistantly arranged dots of various sizes. To this end, it is determined to which area type among a character area, a photographic area and a dot area each image portion in the document original belongs, and image data of the image portion are subjected to an image processing operation in accordance with the area type of the image portion. More specifically, pixels in the character area are subjected to an image processing operation such as a character edge emphasizing operation or a black character emphasizing operation. Pixels in the dot area are subjected to an image processing operation such as a smoothing operation for elimination of a moire.

Whether or not a particular image portion in the document original is a dot area is determined in the following manner. When the document original image is optically read and converted into image data, image data in a plurality of lines are retained in line memories. Then, a cross-shaped check area including an object pixel, two pixels located adjacent the object pixel along a primary scanning direction and two pixels located adjacent the object pixel along a secondary scanning direction is taken to determine whether or not the object pixel has a higher density than any of the adjacent pixels. If the object pixel has a higher density than any of the adjacent pixels, it is judged that the object pixel is a peak pixel. Conversely, if the object pixel has a lower density than any of the adjacent pixels, it is judged that the object pixel is a dip pixel.

After the peak/dip pixels in the check area are thus detected, it is determined whether or not an occurrence pattern of peak pixels or dip pixels in a judgment area composed of a predetermined number of pixels matches any of a plurality of mask patterns for dot areas, or whether or not the occurrence density of the peak pixels or the dip pixels is higher than a predetermined level. If there is a matched pattern or if the occurrence density is higher than the predetermined level, it is judged that the aforesaid judgment area is a dot area.

However, the aforesaid area judging method often fails to correctly judge a dot area in the document original image. Therefore, it is difficult to reliably detect dot areas.

SUMMARY OF THE INVENTION

It is therefore an object of the present invention to provide a dot area judging apparatus which is capable of reliably detecting a dot area.

It is another object of the present invention to provide a dot area judging method which is capable of reliably detecting a dot area.

It is a further object of the present invention to provide a image processing apparatus capable of properly performing an area adaptive processing on image data in a dot area.

The dot area judging apparatus according to the present invention comprises: a data retaining section for retaining image data indicative of densities of individual pixels in a plurality of lines in a document original image; a dot candidate pixel detecting section for detecting a dot candidate pixel on the basis of the image data retained in the data retaining section; a detection result retaining section for retaining detection results obtained for a plurality of lines by the dot candidate pixel detecting section; an extension section for extensively applying a dot candidate pixel detection result obtained for an object line by the dot candidate pixel detecting section to lines adjacent to the object line by modifying the detection results retained in the detection result retaining section; and a dot area judging section for judging, on the basis of distribution of dot candidate pixels within a predetermined judgment base area which distribution is obtained after the extension operation performed by the extension section, that a judgment area having a predetermined positional relationship with the judgment base area is a dot area.

With this arrangement, the dot candidate pixel detection result for the object line is extensively applied to the lines adjacent to the object line. Where an area on the object line is contained in the dot area, there is a high possibility that the lines adjacent to the object line are also contained in the dot area. Therefore, even if an erroneous judgment is made that pixels on the lines adjacent to the object line which are actually dot constituent pixels are not dot candidate pixels, the error can be corrected. By performing the dot area judging operation after the extension operation, the dot area can more reliably be determined than in the case where fixed mask patterns are employed.

In accordance with one embodiment of the present invention, the judgment base area to be employed for the judgment of the dot area includes as its constituent pixels an object pixel and a plurality of pixels located at vertices of a trapezoid surrounding the object pixel. Thus, even a sharp-pointed dot area can assuredly be detected.

The foregoing and other objects, features and effects of the present invention will become more apparent from the following description of the preferred embodiments with reference to the attached drawings.

BRIEF DESCRIPTION OF THE DRAWINGS

FIG. 7 is a diagram for explaining a relationship between a sharp-pointed dot area and the judgment pixels employed for the judgment of the dot area in the common practice;

DESCRIPTION OF THE PREFERRED EMBODIMENTS

Figure 1:
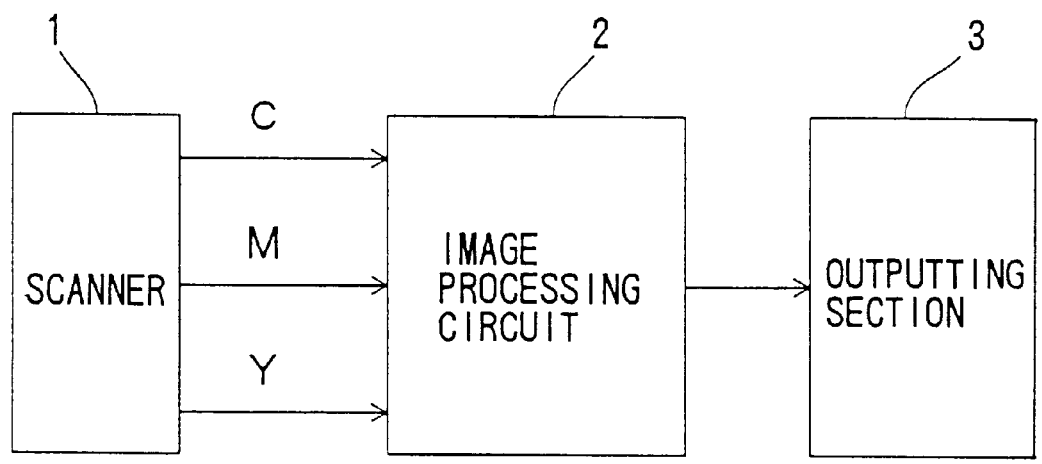
FIG. 1 is a block diagram illustrating the construction of a major portion of a digital color copying machine to which a dot area judging apparatus according to one embodiment of the present invention is applied.

FIG. 1 is a block diagram illustrating the electrical construction of a major portion of a digital color copying machine to which a dot area judging apparatus according to one embodiment of the present invention is applied.

The digital color copying machine includes a scanner (image reading means) 1 for optically reading a color document image, which is to be copied, on a pixel-by-pixel basis. The scanner 1 is, for example, comprised of a CCD (charge coupled device) which has a resolution of about 400 pixels per inch. The scanner 1 photo-electrically converts the read color document image into image data of three primary colors based on the additive process, i.e., red (R), green (G) and blue (B), then converts the RGB image data into image data of three primary colors based on the subtractive process, i.e., yellow (Y), magenta (M) and cyan (C) which are complementary colors of red, green and blue, respectively, and outputs the YMC image data. The YMC image data of individual pixels are $\alpha$-bit digital data (for example, $\alpha=8$, 256 gradation levels) indicative of densities of the respective colors of the pixels in the document image.

The digital color copying machine has an image processing circuit 2 for performing various processing operations on the YMC image data outputted from the scanner 1, and an output section 3 for irradiating a photoreceptor with light for formation of an electrostatic latent image corresponding to the document original image on the basis of the YMC image data processed in the image processing circuit 2.

Figure 2:
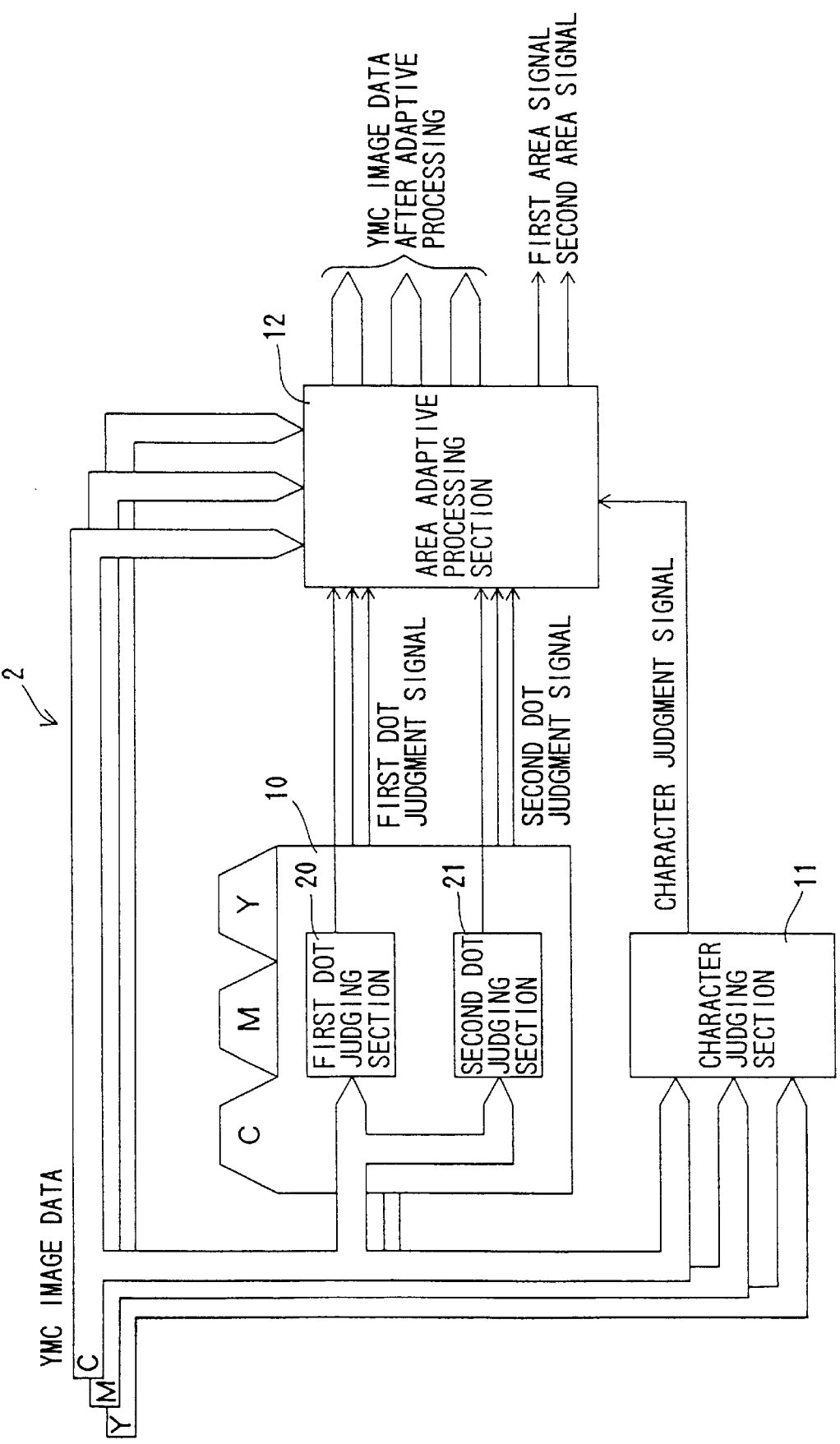
FIG. 2 is a block diagram illustrating the electrical construction of an image processing circuit.

FIG. 2 is a block diagram illustrating the electrical construction of the image processing circuit 2. The image processing circuit 2 has a dot judging section 10 for determining whether or not each of the pixels represented by the inputted YMC image data is in a dot area, and a character judging section 11 for determining whether or not each of the pixels represented by the inputted YMC image data is in a character area. First and second dot judgment signals indicative of judgment results obtained in the dot judging section 10 and a character judgment signal indicative of a judgment result obtained in the character judging section 11 are applied to an area adaptive processing section 12.

The area adaptive processing section 12 processes the YMC image data of each of the pixels in accordance with the image area type of the pixel on the basis of the first and second dot judgment signals and the character judgment signal. The YMC image data having been subjected to the area adaptive processing operation are applied to the output section 3 (see FIG. 1) along with a first area signal and a second area signal indicative of the image area type of the YMC image data of the pixel.

The term "dot area" is herein meant by an image area which has shades represented by equidistantly arranged dot of various sizes.

The dot judging section 10 includes three dot judging sections for the respective YMC colors for judgment of a dot of any color. The YMC image data are inputted to the corresponding color dot judging sections 10.

The dot judging sections 10 each include a first dot judging section 20 for performing a dot area judging operation on the basis of the periodicity of dots, and a second dot judging section 21 for performing a dot area judging operation on the basis of the occurrence density of dots. The first dot judging section 20 determines whether or not the inputted image data represent pixels contained in a dot area by judging whether or not peak/dip pixels (peculiar density point pixels) on a single line show periodicity in occurrence pitch, and outputs the first dot judgment signal. The second dot judging section 21 makes a judgment on an extremely small dot area which cannot be detected by the periodicity-based judging method. The second dot judging section 21 determines, on the basis of the frequency of occurrence of peak/dip pixels and leading- and trailing-edge pixels, whether or not the inputted image data represent pixels contained in a dot area, and outputs the second dot judgment signal. Examples of the extremely small dot area which cannot be detected by the periodicity-based judging method include an isolated dot and a dot area having a width of not greater than a predetermined level (e.g., 3 mm) as measured in the primary scanning direction.

Figure 3:
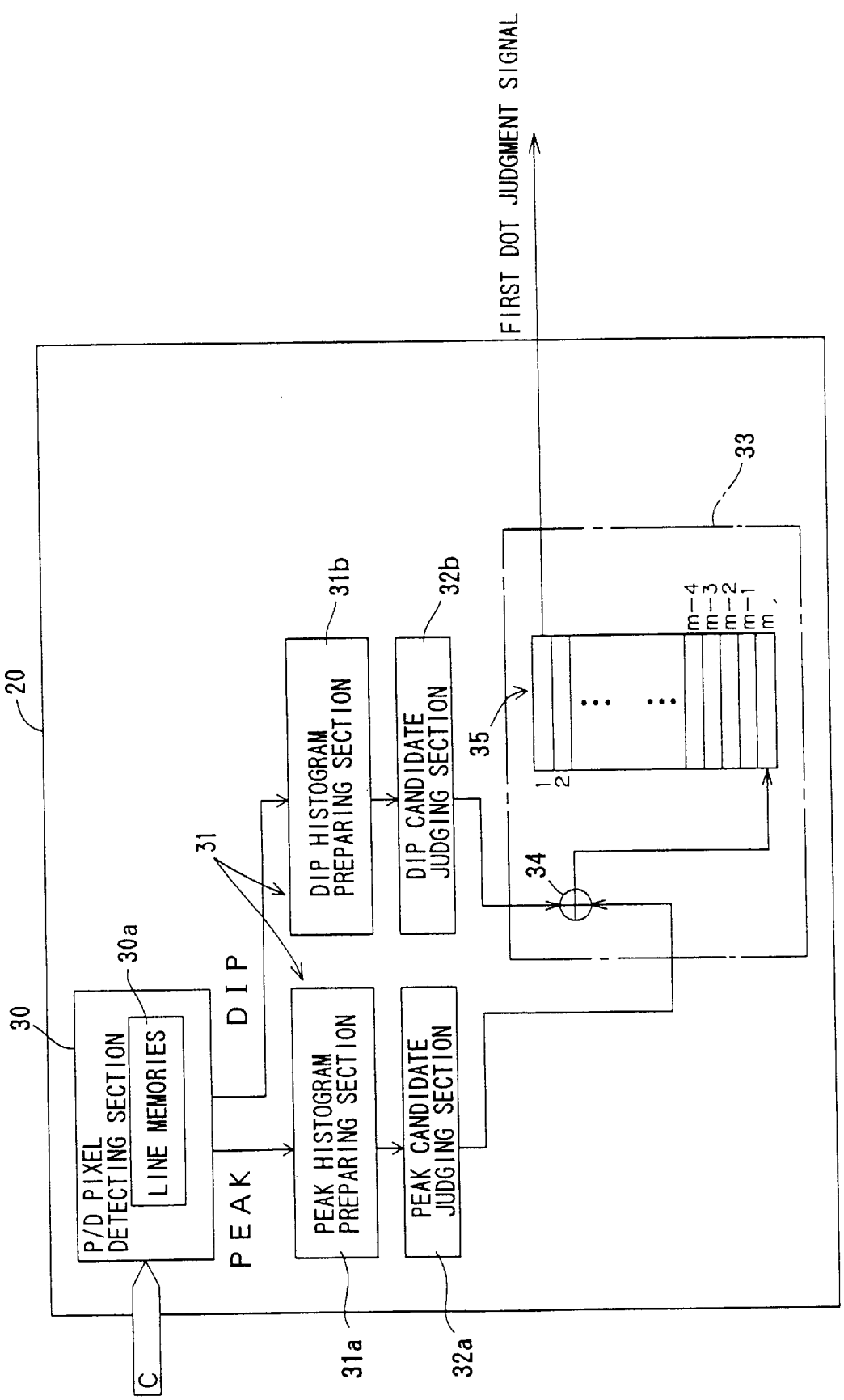
FIG. 3 is a block diagram illustrating the electrical construction of a first dot judging section.

FIG. 3 is a block diagram illustrating the electrical construction of the first dot judging section 20. Although only a first dot judging section 20 which receives C image data inputted thereto is shown in FIG. 3, first dot judging sections 20 for Y and M image data each have the same construction.

The first dot judging section 20 includes a PID pixel detecting section (peak/dip pixel detecting means) 30 for detecting peak/dip pixels. The P/D pixel detecting section 30 has line memories (data retaining means) 30a capable of storing C image data of pixels in four lines. The image data outputted from the scanner 1 are written in the line memories 30a and stored therein. A predetermined line of the four lines is defined as an object line. Pixels on the object line are checked on a pixel-by-pixel basis in the primary scanning direction, each being regarded as an object pixel (first object pixel) for detection of peak/dip pixels. Upon completion of a P/D pixel detecting operation for one line, the subsequent lines are successively subjected to the detecting operation, each being regarded as the object line.

The P/D pixel detecting section 30 determines, on the basis of differences in density between the object pixel and pixels other than the object pixel in a detection area including the object pixel, whether the object pixel is a peak pixel or a dip pixel. Then, a detection result is applied to a histogram preparing section 31. More specifically, if it is determined that the object pixel is a peak pixel, a signal PEAK is applied to a peak histogram preparing section (dot candidate pixel detecting means) 31a. Conversely, if it is determined that the object pixel is a dip pixel, a signal DIP is applied to a dip histogram preparing section (dot candidate pixel detecting means) 31b.

When the signal PEAK is applied, the peak histogram preparing section 31a records the position of a pixel represented by the signal PEAK on the object line. Thus, the position of the peak pixel on the object line is recorded. Upon completion of the detecting operation performed on the object line by the P/D pixel detecting section 30, the peak histogram preparing section 31a specifies a judgment area including n1 consecutive pixels (e.g., n1=48) out of the pixels on the object line. Then, pitches of peak pixels in the specified judgment area are determined, and a peak histogram is prepared which represents the frequencies of the peak pixel pitches. Further, the number of the peak pixels in the judgment area is determined.

Upon completion of a histogram preparing operation for one judgment area, the peak histogram preparing section 31a specifies another judgment area having a head pixel located 16 pixels apart from a head pixel of the previous judgment area in the primary scanning direction. That is, the first 32 pixels in the judgment area overlap with the previous judgment area. Another peak histogram is prepared for the newly specified judgment area, and the number of peak pixels in the judgment area is determined.

The histogram preparing section 31a repeatedly performs the aforesaid operation and, upon completion of the operation for the object line, the resulting peak histograms and peak pixel numbers are applied in conjunction with the corresponding judgment areas to a peak candidate judging section (dot candidate pixel detecting means) 32a.

The start position of the judgment area is shifted by one pixel on every line in the primary scanning direction in a predetermined line cycle TL (e.g., TL=8).

The dip histogram preparing section 31b performs substantially the same operation as the peak histogram preparing section 31a. More specifically, a dip histogram is prepared which represents the frequencies of dip pixel pitches in the judgment area, and the number of dip pixels in the judgment area is determined. Then, this operation is repeated for every newly specified judgment area. Upon completion of the operation for the object line, the resulting dip histograms and dip pixel numbers are applied in conjunction with the corresponding judgment areas to a dip candidate judging section (dot candidate pixel detecting means) 32b.

The peak candidate judging section 32a acquires dot candidate pixels for every judgment area on the basis of the peak histograms and the peak pixel numbers applied thereto from the peak histogram preparing section 31a. The dip candidate judging section 32b acquires dot candidate pixels for every judgment area on the basis of the dip histograms and the dip pixel numbers applied thereto from the dip histogram preparing section 31b.

The following conditions I to III are employed for the acquisition of the dot candidate pixels in the peak candidate judging section 32a. The candidate acquisition conditions to be employed in the dip candidate judging section 32b are parenthesized in the following items I to III.

I. Peak pixel number>Pth (Dip pixel number>Dth)
 II. None of the peak pixel pitches is greater than 14 pixels. (None of the dip pixel pitches is greater than 14 pixels.)
 III. Highest frequency×2>Peak pixel number×3 (Highest frequency×2>Dip pixel number×3)

The condition I is employed for checking whether or not the peak pixel number (dip pixel number) is greater than a threshold Pth (Dth). More specifically, the peak pixels (dip pixels) are periodically arranged in the judgment area if the area is a dot area. Therefore, the peak pixel number (dip pixel number) should be great. The condition II is employed for checking whether or not adjacent peak pixels (dip pixels) are located extremely apart from each other. This is based on the fact that the peak pixels (dip pixels) should be densely present in the dot area. The condition III is employed for checking whether or not there is a peak pixel pitch (dip pixel pitch) which has a frequency accounting for greater than 75% of the sum of frequencies of the peak pixel pitches (dip pixel pitches). Since the peak pixels (dip pixels) are periodically arranged in the dot area, the peak pixel pitches (dip pixel pitches) approximate a certain value.

If the conditions I to III are all satisfied, the peak candidate judging section 32a and the dip candidate judging section 32b regard middle n2 pixels (e.g., n2=32) in the judgment area composed of n1 pixels as dot candidate pixels. Conversely, if all the conditions I to III are not satisfied, the peak candidate judging section 32a and the dip candidate judging section 32b regard the pixels in the judgment area as non-dot pixels.

The peak candidate judging section 32a and the dip candidate judging section 32b perform the aforesaid operation on the object line. Upon completion of the operation for the object line, judgment results for a plurality of judgment areas on the object line are OR-combined (logical sum), and the result of the OR-combination serves as a judgment result for the object line. More specifically, a pixel regarded as a dot candidate pixel in the judging operation for any one of the judgment areas is regarded as a dot candidate pixel, irrespective of the judgment results obtained in the judging operation for the other judgment areas. Candidate data indicative of the judgment result for the object line are applied to a dot extension judging section (extension means, determining means and judging means) 33.

The dot extension judging section 33 includes an OR-combining section 34 for OR-combining respective candidate data obtained by the peak candidate judging section 32a and the dip candidate judging section 32b. More specifically, pixels judged to be dot candidate pixels in either one of the peak candidate judging section 32a and the dip candidate judging section 32b are regarded as dot candidate pixels, irrespective of the judgment result obtained in the other judging section. The result of the OR-combination obtained in the OR-combining section 34 is retained as candidate data in a line memory section (detection result retaining means) 35. The line memory section 35 includes m line memories (e.g., m=13), and the candidate data for the aforesaid object line is retained in the m-th (last) line memory.

The data are successively subjected to the OR-combining operation on a line-by-line basis by the dot extension judging section 33, and the resultant candidate data are successively retained in the line memory section 35. In this case, the candidate data retained in the m-th line memory, for example, are shifted to the (m−1)-th line memory, and new candidate data are retained in the empty m-th line memory. Thus, candidate data are written in the line memory section 35 while being successively shifted therein. As a result, the line memory section 35 retains the candidate data of the first to m-th lines in a sequence corresponding to the secondary scanning direction.

The dot extension judging section 33 starts the dot candidate area extension operation with the candidate data retained in the entire line memory section 35. More specifically, the (m−2)-th line is regarded as an object line LO, and the candidate data on the object line LO are extensively applied to pixels at corresponding positions on each of two consecutive lines located upstream and downstream of the object line LO with respect to the secondary scanning direction (the (m−4)-th, (m−3)-th, (m−1)-th and m-th lines). That is, the pixels located on the two consecutive lines upstream and downstream of the object line LO at the positions corresponding to the dot candidate pixels on the object line LO are also regarded as dot candidate pixels. The data of pixels other than the dot candidate pixels on the object line LO are not extensively applied to the other lines.

A reason why the dot candidate pixels are extensively applied to the two consecutive lines upstream and downstream of the object line LO is that, where the object line LO is contained in the dot area, there is a high possibility that the lines located upstream and downstream of the object line LO also belong to the dot area. Thus, even if an erroneous judgment is made that one pixel is not a dot candidate pixel, the judgment is corrected to regard the pixel as a dot candidate pixel.

Upon completion of the dot candidate area extension operation for the object line LO, the dot extension judging section 33 performs a dot area judging operation for the same object line LO.

Figure 4:
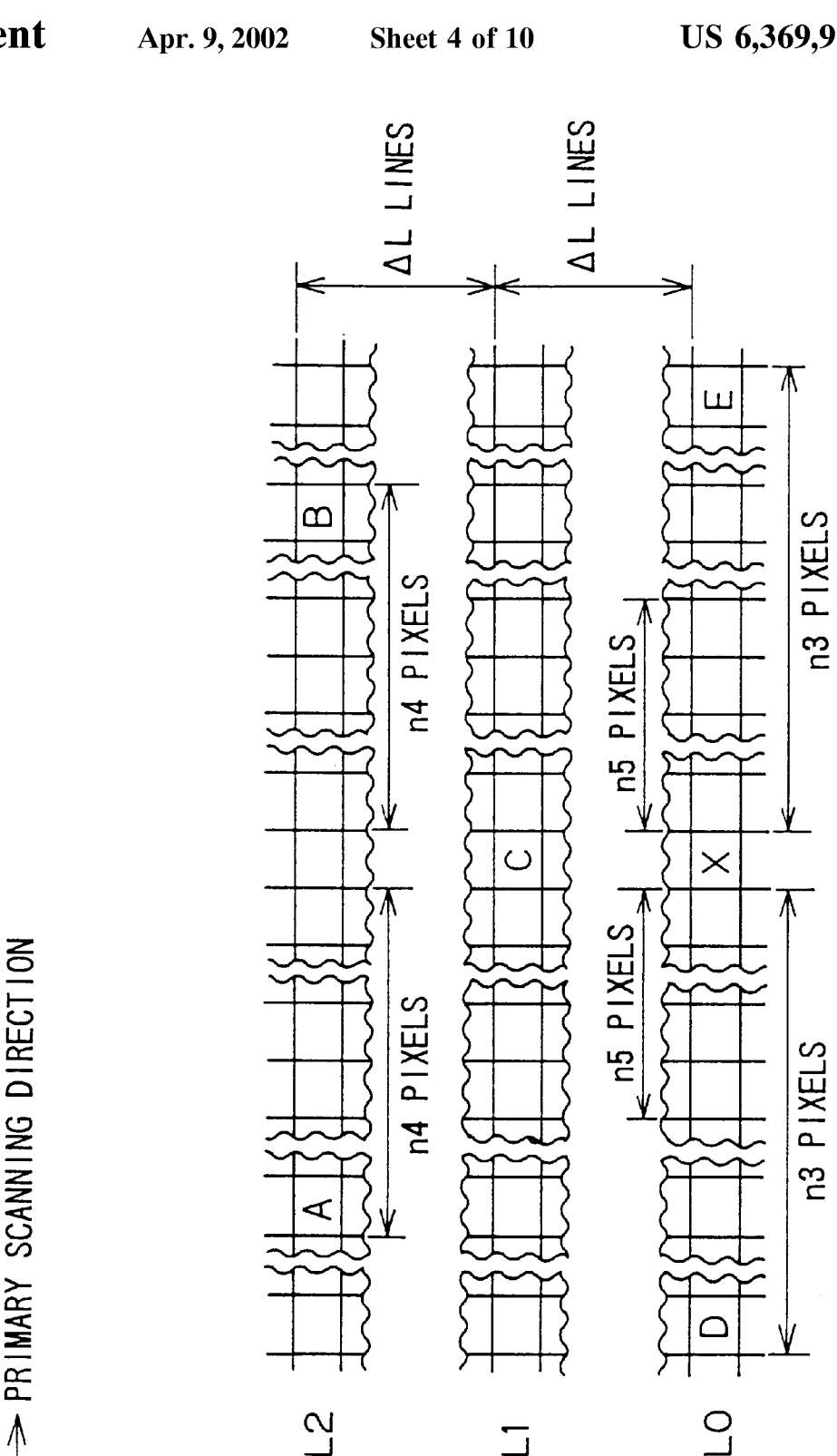
FIG. 4 is a diagram for explaining judgment pixels.

FIG. 4 is a diagram for explaining the dot area judging operation to be performed by the dot extension judging section 33. For the dot area judging operation, the dot extension judging section 33 utilizes the candidate data retained in the line memories for the object line LO and the lines located upstream of the object line LO with respect to the secondary scanning direction, i.e., the candidate data retained in the first to (m−2)-th line memories (see FIG. 3). More specifically, an object pixel (second object pixel) X is defined on the object line LO, and k judgment pixels A to E (e.g., k=5) are defined as constituent pixels of a judgment base area for the object pixel X. The dot area judging operation is performed by utilizing the k judgment pixels A to E thus defined.

The judgment pixels A to E are defined in the following manner.

Pixels which are located n3 pixels (e.g., n3=50) apart from the object pixel X upstream and downstream of the object pixel X with respect to the primary scanning direction are defined as the judgment pixels D and E. A pixel which is located on a line L1 (located ΔL lines apart from the object line LO upstream with respect to the secondary scanning direction) at a position corresponding to the object pixel X with respect to the primary scanning direction is defined as the judgment pixel C. Pixels which are located on a line L2 (located ΔL lines apart from the line L1 upstream with respect to the secondary scanning direction) at positions corresponding to pixels located n4 pixels (n4<n3, e.g., n4=n3/2=25) apart from the object pixel X upstream and downstream with respect to the primary scanning direction are defined as the judgment pixels A and B.

Thus, a distance between the two judgment pixels D and E defined on the object line LO where the object pixel X is located is set greater than a distance between the two judgment pixels A and B defined on the line L2. In other words, the four judgment pixels A, B, D and E excluding the judgment pixel C are located at vertices of a trapezoid formed by linearly connecting the adjacent judgment pixels, and the judgment pixel C is located within the trapezoid.

With reference to the candidate data of the object pixel X and candidate data of the judgment pixels A to E thus defined, the dot extension judging section 33 judges whether or not candidate data of three or more of the six judgment pixels represent dot candidate pixels. If candidate data of three or more judgment pixels represent the dot candidate pixels, the dot extension judging section 33 determines that a judgment area defined between pixels located n5 pixels (e.g., n5=16) apart from the object pixel X upstream and downstream with respect to the primary scanning direction is a dot area.

Thereafter, the dot extension judging section 33 defines as a new object pixel a pixel located adjacent the object pixel X downstream with respect to the primary scanning direction, and performs the dot area judging operation in the aforesaid manner. Upon completion of the dot area judging operation for the object line LO, the candidate data retained in the respective line memories are shifted to the adjacent line memories upstream in the secondary scanning direction, and then the aforesaid dot area extension operation and dot area judging operation are performed with the (m−2)-th line being defined as the object line. When the candidate data retained in the respective line memories are shifted, the dot extension judging section 33 outputs the candidate data retained in the first line memory as the first dot judgment signal.

Figure 5:
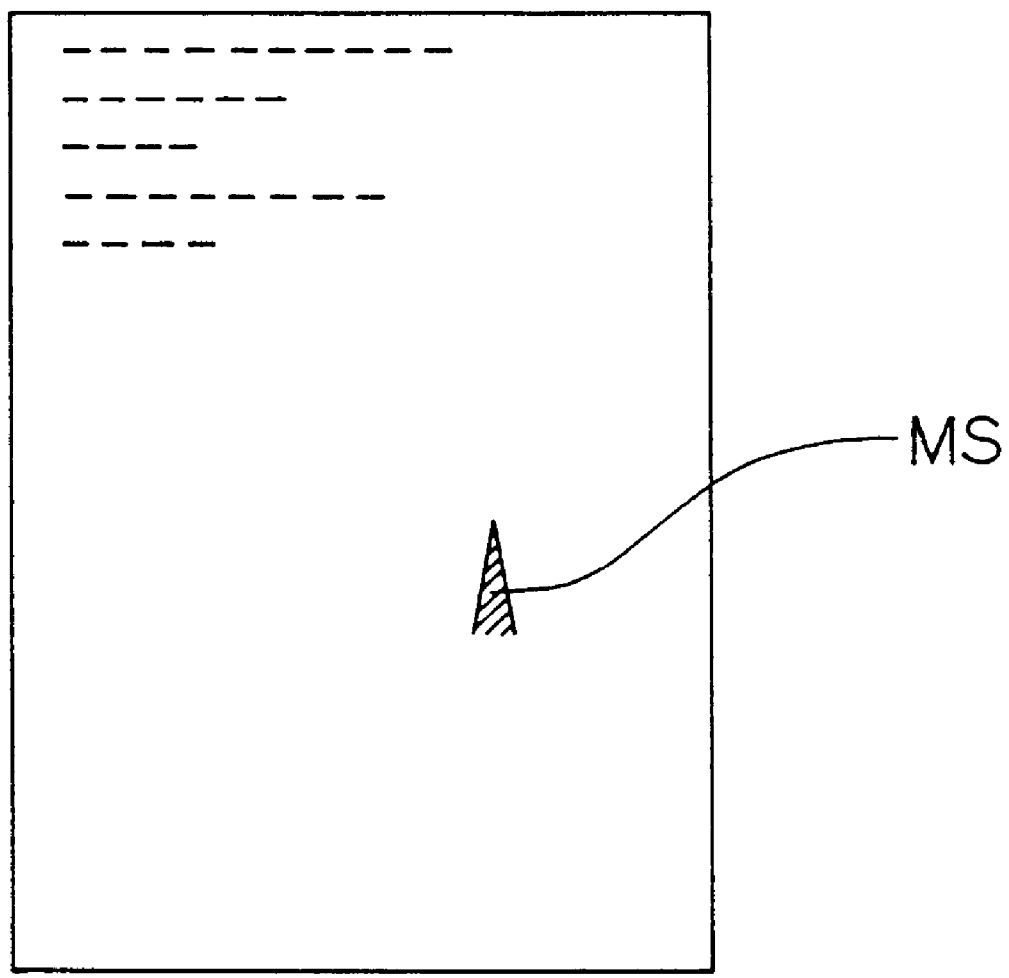
FIG. 5 is a diagram for explaining a sharp-pointed dot area in a document original image.

The dot area judging operation thus performed with the judgment pixels defined as being located at the vertices of the trapezoid is advantageous particularly in that a sharp-pointed dot area MS (hatched portion) in a document original image as shown in FIG. 5 can assuredly be detected.

Figure 6:
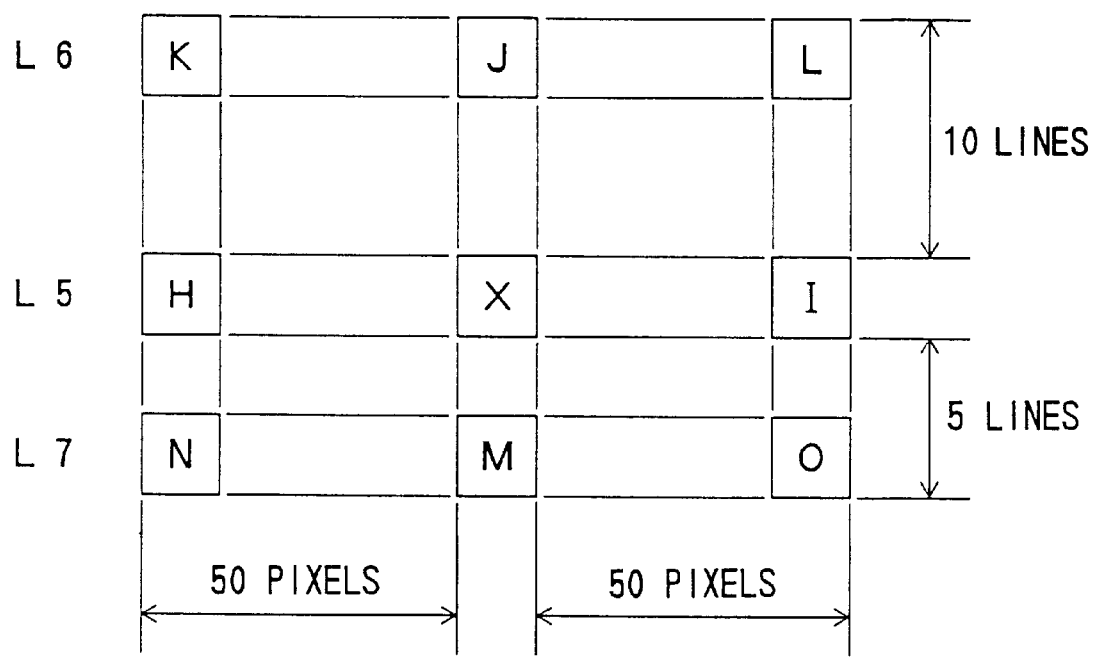
FIG. 6 is a diagram for explaining judgment pixels to be employed for judgment of a dot area in a common practice.

It has been a common practice to define judgment pixels within a rectangular frame surrounding an object pixel X as shown in FIG. 6. More specifically, pixels which are located 50 pixels apart from the object pixel X upstream and downstream with respect to the primary scanning direction on a line L5 where the object pixel X is located are defined as judgment pixels H and I. A pixel which is located on a line L6 located 10 lines apart from the object line L5 upstream with respect to the secondary scanning direction at a position corresponding to the object pixel X with respect to the primary scanning direction is defined as a judgment pixel J. Pixels which are located 50 pixels apart from the judgment pixel J upstream and downstream with respect to the primary scanning direction are defined as judgment pixels K and L. A pixel which is located on a line L7 located 5 lines apart from the object line L5 downstream with respect to the secondary scanning direction at a position corresponding to the object pixel X with respect to the primary scanning direction is defined as a judgment pixel M. Pixels which are located 50 pixels apart from the judgment pixel M upstream and downstream with respect to the primary scanning direction are defined as judgment pixels N and O.

In the common practice, a dot area judging operation is performed on the basis of candidate data of the judgment pixels thus defined. In this case, an area defined between two pixels located 16 pixels apart from the object pixel X upstream and downstream with respect to the primary scanning section are judged to be a dot area, if candidate data of five out of the ten pixels including the object pixel X and the nine judgment pixels H to O represent dot candidate pixels.

Where the judgment pixels within the rectangular frame are utilized for the judgment of a sharp-pointed dot area, most of the judgment pixels are excluded from the dot area. As shown in FIG. 7, for example, only the object pixel X and the two judgment pixels J and M are included in the sharp-pointed dot area MS. Since the judgment conditions described above are not satisfied, it is determined that the area MS is not a dot area though the area MS is actually a dot area.

Figure 8:
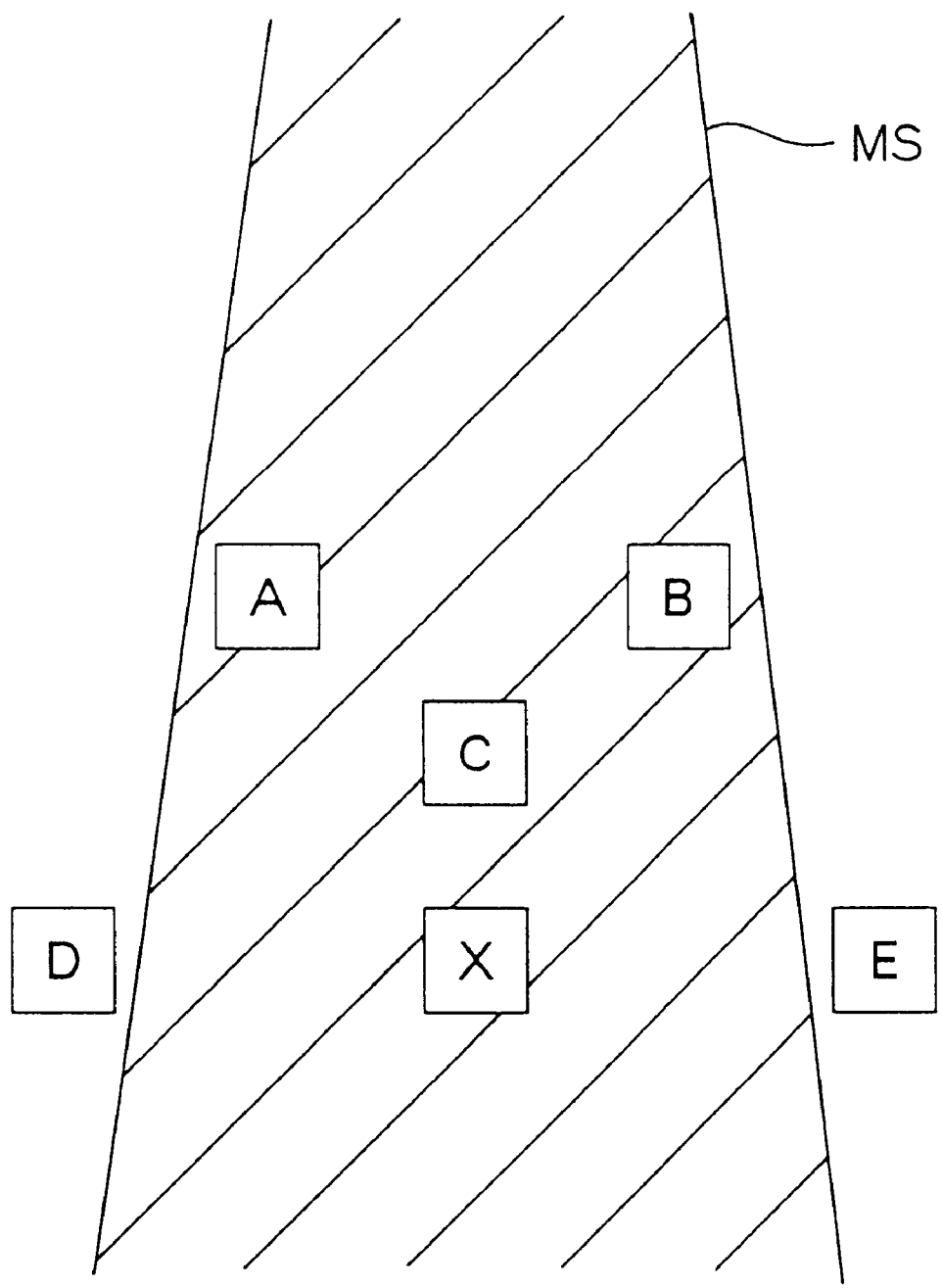
FIG. 8 is a diagram for explaining a relationship between the sharp-pointed dot area and judgment pixels employed in the embodiment.

In the present embodiment, however, the judgment pixels are defined as being located at vertices of a trapezoid and, hence, there is a higher possibility that three or more of the judgment pixels are included in the sharp-pointed dot area as shown in FIG. 8. Therefore, the dot area judging operation utilizing the judgment pixels defined in accordance with the present embodiment can correctly judge even a sharp-pointed dot area.

Figure 9:
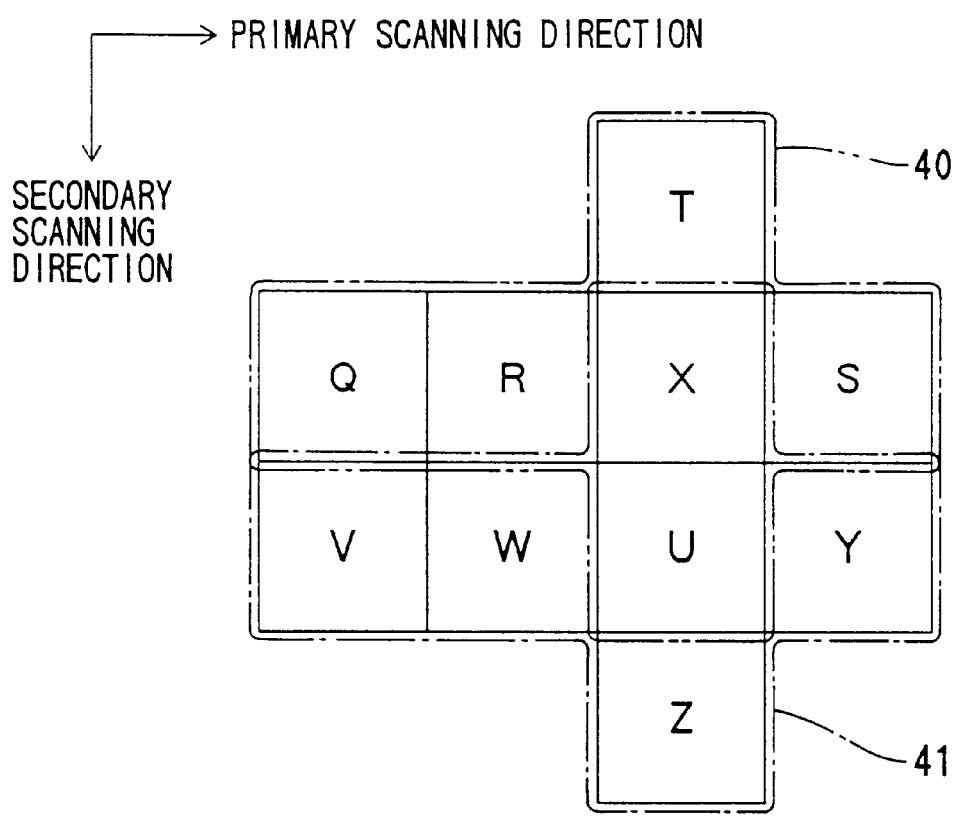
FIG. 9 is a diagram for explaining detection areas to be employed for detection of a peak/dip pixel.

FIG. 9 is a diagram for explaining the detecting operation to be performed in the P/D pixel detecting section 31. The P/D pixel detecting section 31 specifies a "modified cross-shaped" detection area, and determines whether the object pixel in the thus specified detection area is a peak pixel or a dip pixel, or neither a peak pixel nor a dip pixel.

Two detection areas 40 and 41 are specified as being partially overlapped, and subjected to the detecting operation by the P/D pixel detecting section 31. In this case, a peak pixel detecting operation and a dip pixel detecting operation are simultaneously performed.

The detection area 40 includes the object pixel X, two pixels Q and R consecutively located upstream of the object pixel X with respect to the primary scanning direction, a pixel S located adjacent the object pixel X downstream with respect to the primary scanning direction, and two pixels T and U located adjacent the object pixel X upstream and downstream with respect to the secondary scanning direction. The detection area 41 has substantially the same configuration as the detection area 40 with the pixel U in the detection area 40 regarded as an object pixel in the detection area 41. More specifically, the detection area 41 includes two pixels V and W consecutively located upstream of the pixel U with respect to the primary scanning direction, a pixel Y located adjacent the pixel U downstream with respect to the primary scanning direction, and two pixels X and Z located adjacent the pixel U upstream and downstream with respect to the secondary scanning direction.

The peak pixel detection is performed in the following manner. The P/D pixel detecting section 31 judges whether or not the object pixel X satisfies the following detection conditions (i) to (iv) and whether or not the pixel U satisfies the following detection conditions (v) to (viii). If all the detection conditions (i) to (iv) are satisfied or if all the detection conditions (v) to (viii) are satisfied, it is determined that the object pixel X is a peak pixel. In the following conditions (i) to (viii), "D*" represents image data of a pixel "*", and Np and Tp are predetermined threshold values.

(i) $Dx \geq Ds$ (ii) $Dx > Np$ (iii) $Dx-Dq > Tp$ or $Dx-Dr > Tp$ (iv) ($Dx-Dt > Tp$ and $Dx \geq Du$) or ($Dx-Du > Tp$ and $Dx \geq Dt$)

(v) $Du \geq Dy$ (vi) $Du > Np$ (vii) $Du-Dv > Tp$ or $Du-Dw > Tp$ (viii) ($Du-Dx > Tp$ and $Du \geq Dz$) or ($Du-Dz > Tp$ and $Du \geq Dx$)

The dip pixel detection is performed in the following manner. The P/D pixel detecting section 31 judges whether or not the object pixel X satisfies the following detection conditions (xi) to (xiv) and whether or not the pixel U satisfies the following detection conditions (xv) to (xviii). If all the detection conditions (xi) to (xiv) are satisfied or if all the detection conditions (xv) to (xviii) are satisfied, it is determined that the object pixel X is a dip pixel. In the following conditions (xi) to (xviii), Nd and Td are predetermined threshold values.

Figure 10:
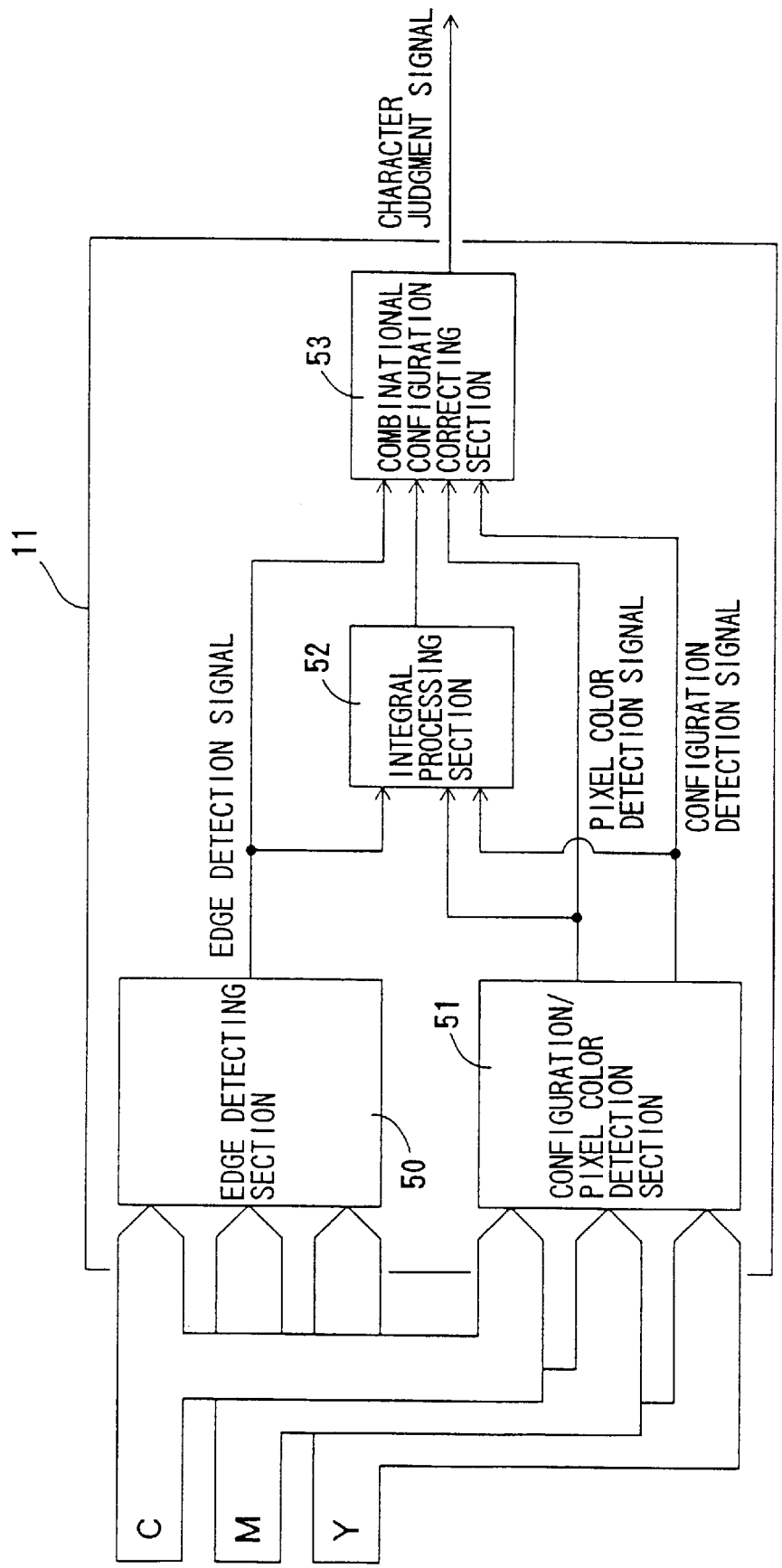
FIG. 10 is a block diagram illustrating the electrical construction of a character judging section.

(xi) $Dx \leq Ds$ (xii) $Dx > Nd$ (xiii) $Dq-Dx > Td$ or $Dr-Dx > Td$ (xiv) $Dt-Dx > Td$ or $Du-Dx > Td$ (xv) $Du \leq Dy$ (xvi) $Dy > Nd$ (xvii) $Dv-Du > Td$ or $Dw-Du > Td$ (xviii) $Dx-Du > Td$ or $Dz-Du > Td$ FIG. 10 is a block diagram illustrating the electrical construction of the character judging section 11. The character judging section 11 includes an edge detecting section 50 for detecting an edge and an edge orientation and, if any edge is detected, determining the density of the edge on the basis of the edge orientation, and a configuration/pixel color detection section 51 for determining the configuration of the edge (peak, dip, inclination, normal or the like) and a pixel color.

An edge detection signal from the edge detecting section 50 and a configuration detection signal and a pixel color detection signal from the configuration/pixel color detection section 51 are applied to an integral processing section 52. The integral processing section 52 performs an integral processing operation on the basis of the detection signals applied thereto. More specifically, the color of an object pixel is determined on the basis of the edge density and the edge configuration. Exemplary colors to be determined include white, black and gray. Thus, it is determined whether the object pixel is a character constituent pixel.

The result of the integral processing operation performed by the integral processing section 52 is applied as an integral processing signal to a combinational configuration correcting section 53. The combinational configuration correcting section 53 receives the edge detection signal, the configuration detection signal and the pixel color detection signal in addition to the integral processing signal. The combinational configuration correcting section 53 corrects the result of the integral processing operation on the basis of these detection signals. More specifically, the judgment result for the object pixel is corrected on the basis of the color of pixels around the object pixel indicated by the result of the integral processing operation. Thus, whether or not the object pixel is a character constituent pixel can assuredly be judged. Then, the combinational configuration correcting section 53 outputs a character judgment signal indicative of the judgment result.

In accordance with the embodiment describe above, dot candidate pixels on an object line LO are extensively applied to two consecutive lines located upstream and downstream of the object line LO with respect to the secondary scanning direction, and then the dot area judging operation is performed. Therefore, the judgment of a dot area is more reliable than in a case where fixed mask patterns are employed for the judgment.

Since the judgment pixels to be utilized for the dot area judging operation are defined as being located at vertices of a trapezoid, a sharp-pointed dot area can correctly be judged.

While one embodiment of the present invention has thus been described, the invention is not limited to the embodiment. Although a digital color copying machine is employed as one example for the explanation of the invention, the invention is applicable to any other image forming apparatuses such as color facsimiles and color printers which are required to have the function of discriminating dot areas.

While the present invention has been described in detail by way of the embodiment thereof, it should be understood that the foregoing disclosure is merely illustrative of the technical principles of the present invention but not limitative of the same. The spirit and scope of the present invention are to be limited only by the appended claims.

This application claims priority benefits under 35 USC 119 on the basis of Japanese Patent Application No. 9-310846 filed to the Japanese Patent Office on Nov. 12, 1997, the disclosure thereof being incorporated herein by reference.

What is claimed is:

1. A dot area judging apparatus, comprising:

data retaining means for retaining image data indicative of densities of individual pixels in a plurality of lines in a document original image;

dot candidate pixel detecting means for detecting a dot candidate pixel on the basis of the image data retained in the data retaining means;

detection result retaining means for retaining detection results obtained for a plurality of lines by the dot candidate pixel detecting means;

extension means for extensively applying a dot candidate pixel detection result obtained for an object line by the dot candidate pixel detecting means to lines adjacent to the object line by modifying the detection results retained in the detection result retaining means; and dot area judging means for judging, on the basis of a distribution of dot candidate pixels within a predetermined judgment base area which distribution is obtained after the extension operation performed by the extension means, that a judgment area having a predetermined positional relationship with the judgment base area is a dot area, the dot area judging means including:

means for defining a second object pixel and a plurality of judgment pixels having a predetermined positional relationship with the second object pixel as constituent pixels of the judgment base area, the constituent pixels of the judgment base area not being adjacent to the second object pixel;

judging means for judging whether a number of the dot candidate pixels out of the constituent pixels in the judgment base area is not smaller than a predetermined number; and determining means for determining, if it is judged by the judging means that the number of dot candidate pixels out of the constituent pixels is not smaller than the predetermined number, that the judgment area which is a predetermined area on the object line including the second object pixel is a dot area.

2. A dot area judging apparatus as set forth in claim 1, wherein the dot candidate pixel detecting means includes:

peculiar point pixel detecting means for detecting peculiar density point pixels by comparing image data of a first object pixel with image data of pixels located around the first object pixel in a predetermined detection area including the first object pixel, the image data of the first objective pixel and the pixels located around the first objective pixel being retained in the data retaining means; and means for detecting the dot candidate pixel on the basis of an occurrence pattern of the peculiar density point pixels detected by the peculiar point pixel detecting means.

3. A dot area judging apparatus as set forth in claim 1, wherein the judgment base area includes a plurality of pixels located at vertices of a trapezoid surrounding the second object pixel.

4. An image processing apparatus, comprising:

data retaining means for retaining image data indicative of densities of individual pixels in a plurality of lines in a document original image;

dot candidate pixel detecting means for detecting a dot candidate pixel on the basis of the image data retained in the data retaining means;

detection result retaining means for retaining detection results obtained for a plurality of lines by the dot candidate pixel detecting means;

extension means for extensively applying a dot candidate pixel detection result obtained for an object line by the dot candidate pixel detecting means to lines adjacent to the object line by modifying the detection results retained in the detection result retaining means;

dot area judging means for judging, on the basis of a distribution of dot candidate pixels within a predetermined judgment base area which distribution is obtained after the extension operation performed by the extension means, that a judgment area having a predetermined positional relationship with the judgment base area is a dot area; and area adaptive processing means for processing the image data by performing an area adaptive processing operation in accordance with a judgment result obtained by the dot area judging means and outputting the processed image data, the dot area judging means including:

means for defining an object pixel and a plurality of judgment pixels having a predetermined positional relationship with the object pixel as constituent pixels of the judgment base area, the constituent pixels of the judgment base area not being adjacent to the object pixel;

judging means for judging whether a number of the dot candidate pixels out of the constituent pixels in the judgment base area is not smaller than a predetermined number; and determining means for determining, if it is judged by the judging means that the number of dot candidate pixels out of the constituent pixels is not smaller than the predetermined number, that the judgment area which is a predetermined area on the object line including the object pixel is a dot area.

5. An image processing apparatus as set forth in claim 4, further comprising:

image reading means for reading a document original image and outputting image data indicative of densities of individual pixels; and means for writing the image data outputted from the image reading means in the data retaining means.

6. An image processing apparatus as set forth in claim 4, further comprising:

outputting means for forming an image on the basis of the image data processed by the area adaptive processing means.

7. A dot area judging method, comprising the steps of:

detecting dot candidate pixels by using image data indicative of densities of individual pixels in a plurality of lines in a document original image;

extensively applying a dot candidate pixel detection result for an object line to lines adjacent to the object line; and judging, on the basis of distribution of dot candidate pixels within a predetermined judgment base area which distribution is obtained after the extensive application, that a judgment area having a predetermined positional relationship with the judgment base area is a dot area, the dot area judging step including the steps of:

defining an object pixel and a plurality of judgment pixels having a predetermined positional relationship with the object pixel as constituent pixels of the judgment base area, the constituent pixels of the judgment base area not being adjacent to the object pixel;

judging whether a number of the dot candidate pixels out of the constituent pixels in the judgment base area is not smaller than a predetermined number; and determining, if it is judged that the number of dot candidate pixels out of the constituent pixels is not smaller than the predetermined number, that the judgment area which is a predetermined area on the object line including the object pixel is a dot area.

* * * * *